R. FLEISCHMANN.
COLLAPSIBLE OR FOLDING CARRIAGE.
APPLICATION FILED SEPT. 9, 1908.
913,487.
Patented Feb. 23, 1909.
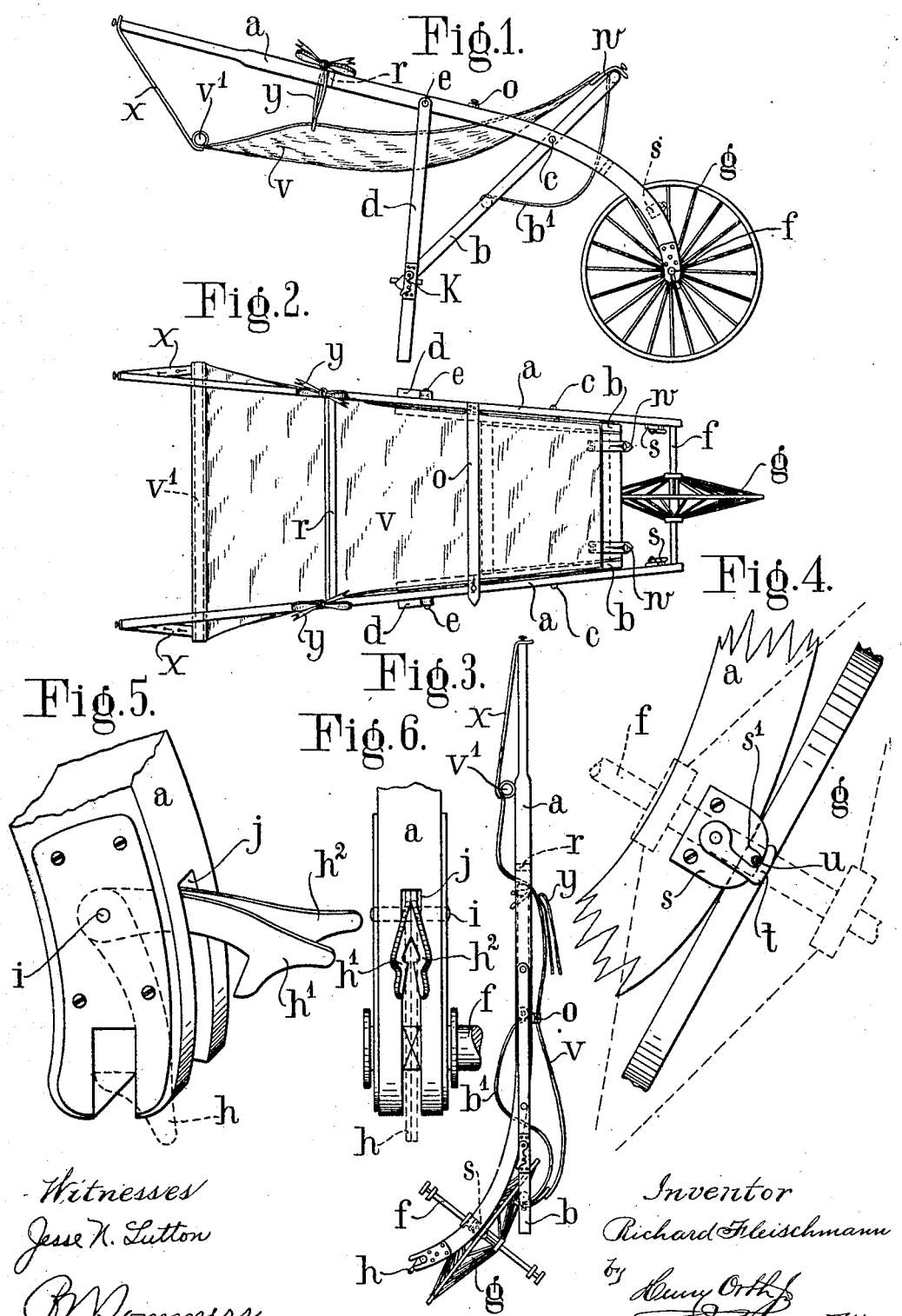

UNITED STATES PATENT OFFICE.

RICHARD FLEISCHMANN, OF MÖDLING, AUSTRIA-HUNGARY.

COLLAPSIBLE OR FOLDING CARRIAGE.

No. 913,487.  Specification of Letters Patent.  Patented Feb. 23, 1909.

Application filed September 9, 1908. Serial No. 452,246.

*To all whom it may concern:*

Be it known that I, RICHARD FLEISCHMANN, a subject of the Emperor of Austria-Hungary, residing at Mödling, in Lower Austria, Austria - Hungary, have invented certain new and useful Improvements in Collapsible or Folding Carriages; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to improvements in collapsible or folding infant carriages having readily detachable wheels, and in which the seat-supporting members and legs are pivoted on the inside and outside of the shafts so that the structure may be collapsed and the several parts assembled in the same plane.

The objects of my improvements are to provide means for readily securing the detached wheel to the shafts when the parts are collapsed, and also to provide, in addition to the usual seat, a flexible member adapted to serve either as a head rest or body support and that may be quickly and readily secured to the seat supporting members and to the shafts without removing the seat or in any way changing or altering the parts of the carriage.

Figures 1 and 2 of the accompanying illustrative drawings show in elevation and plan respectively an infant carriage embodying this invention, with a single road wheel, the parts being in the position they occupy when arranged for conveying an infant lying down. Fig. 3 shows in side elevation the parts of the carriage folded together. Fig. 4 is a detail view of part of Fig. 3 on a larger scale. Figs. 5 and 6 show likewise on a larger scale in perspective and in end view the end part of a main carrier member or shaft forming the wheel axle bearing.

To the main carrier members or shafts $a$ of the carriage are attached on the inside members $b$ which support the seat strip $b'$ and on the outside legs $d$. The members $b$ are mounted to turn about bolts $c$ and in like manner the legs $d$ can turn about bolts $e$.

The front end of each member $a$ is fork-shaped and serves as a housing for the axle $f$ of the road wheel $g$ and which axle is quadrangular in cross section at the points of support.

For the purpose of securely fixing the axle in its housings there are provided hooks $h$ which are mounted to turn about pins and are fitted in longitudinal slots $j$ formed in the ends of the members $a$. These hooks each consist of two parts $h'$ and $h^2$ the ends of which tend to spring apart and which when the hooks are in the working position as shown by dotted lines in Fig. 5 are held fast in the slots $j$ owing to the spring pressure and the friction caused thereby.

In the position for use shown in Figs. 1 and 2 the ends of the seat carriers $b$ are attached to the downwardly extending legs $d$ by easily detachable connections $k$ of any desired construction.

Near the axle supports and on the inside of the members $a$ are fixed plates $s$ each formed with an open slot $s'$ and to each of which is attached a pivoted hook $t$. The latter when in the position shown in Fig. 4 close the slots $s'$ in the plates $s$.

To the frame of the carriage may be attached a hammock $v$ of sail cloth of a suitable length for a child to be comfortably carried lying down. For this purpose in the example illustrated there are attached to the head end of the hammock strip $v$ short latchets $w$ adapted to be readily hitched onto the end of the seat carrier $b$. To the other end of the hammock strip $v$ are attached two belt lengths $x$ which can be hitched to the free ends of the members $a$. The belt lengths $x$ are each formed as shown in Fig. 2 with a row of holes for the purpose of adjusting the drop of the hammock as desired. The hammock strip $v$ may also be connected to the carrier members $a$ at both sides by means of strings or bands $y$.

To fold the carriage up the connections $k$ of the seat carriers $b$ to the legs $d$ are first released after which the parts $b$ and $d$ are turned into the plane of the shafts $a$, see Fig. 3. After the road wheel $g$ has been removed from its axle housings by releasing the hooks $h$, two spokes $u$ thereof are inserted into the slots $s'$ in the plates $s$ and secured therein by the hooks $t$ being brought into their closing position. This accordingly provides for a quick and easy securing of the removed wheels. The carriage thus folded up can be carried conveniently by the cross beam $r$ as hand luggage.

The hammock strip v, which may however be attached to the frame of the carriage in any other suitable manner to that described is, when the frame of the carriage is folded up, held by the safety strap o which is attached to one carrier member a and buttoned onto the other member a and which when in use is suitable for holding the child in position.

If the hammock strip v be not used at all, for example when the seat strip b' is in use, it may, after disconnecting the belts x and strings y, be rolled up upon a stiffener bar v' pushed into the loop-shaped foot end of the strip v and when in said rolled up condition can be readily attached to the seat carrier to form a head rest or be entirely taken away.

Claim.

1. A carriage of the class described in which is combined the main shafts having axle housings formed in one end, a road wheel having its axle detachably mounted in said housings, supporting legs, and seat-supporting members pivoted to the shafts and adapted to be moved into the plane of the latter, means to operatively connect the legs and seat supports and means on the shafts above said housings to receive and lock the spokes of the detached wheel thereto.

2. A carriage of the class described in which is combined the main shafts having axle housings formed in one end, a road wheel having its axle detachably mounted in said housings, supporting legs and seat supporting members pivoted to the shafts and adapted to be moved into the plane of the latter, means to operatively connect the legs and seat supports, and slotted members fixed on the shafts above said housings adapted to receive the spokes of the detached wheel.

3. A carriage of the class described in which is combined the main shafts having axle housings formed in one end, a road wheel having its axle detachably mounted in said housings, supporting legs and seat supporting members pivoted to the shafts and adapted to be moved into the plane of the latter, means to operatively connect the legs and seat supports, plates secured to the shafts above the housings having slots therein to receive the spokes of the detached wheel, and locking hooks pivoted on the plates adapted to close the end of the slots and engage the spokes therein.

4. A carriage of the class described in which is combined the main shafts, a road wheel detachably mounted therein, supporting legs and seat-supporting members pivoted to the shafts and adapted to be moved into the plane of the latter, means to operatively connect the legs and seat supports, and a flexible body-support detachably connected at one end to the shafts and at the other end to the seat support.

5. A carriage of the class described in which is combined the main shafts, a road wheel detachably mounted therein, supporting legs and seat-supporting members pivoted to the shafts and adapted to be moved into the plane of the latter, means to operatively connect the legs and seat supports, and a flexible body-support detachably connected to one end to the shafts and at the other end to the seat-support, said body-support having a loop in one end for the reception of a stiffening bar upon which said support may be rolled to form a head-rest.

In testimony that I claim the foregoing as my invention, I have signed my name in presence of two subscribing witnesses.

RICHARD FLEISCHMANN.

Witnesses:
  JOSEF RUBARDO,
  ROBERT W. HEINGARTNER.